Dec. 3, 1968          J. C. MEDLEY          3,414,289
MOUNTING STRUCTURE FOR INDIVIDUALLY SUSPENDED VEHICLE WHEELS
Filed July 22, 1966          3 Sheets-Sheet 1
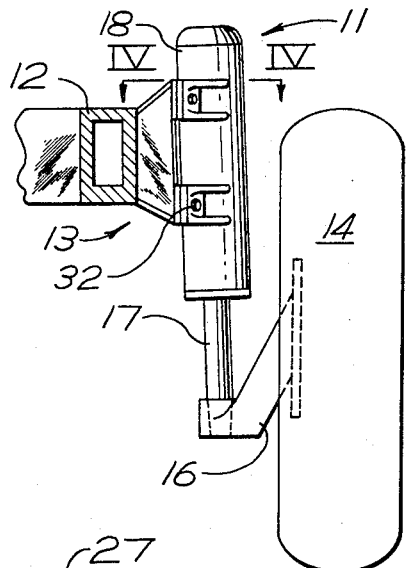
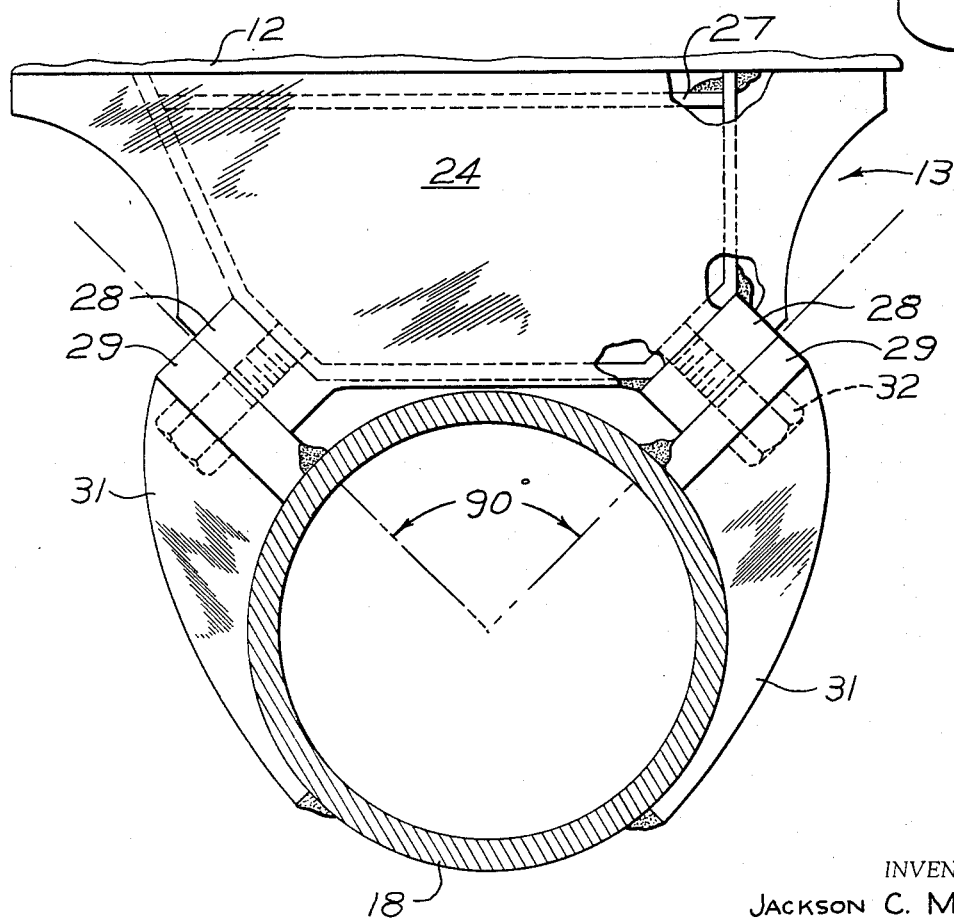
INVENTOR.
JACKSON C. MEDLEY
BY Fryer, Tjensvold, Feix & Phillips
ATTORNEYS Dec. 3, 1968    J. C. MEDLEY    3,414,289
MOUNTING STRUCTURE FOR INDIVIDUALLY SUSPENDED VEHICLE WHEELS
Filed July 22, 1966    3 Sheets-Sheet 2
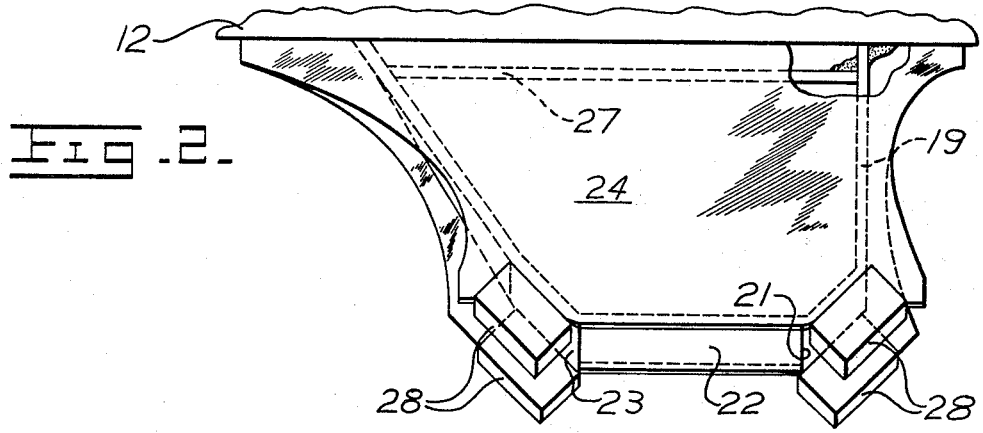
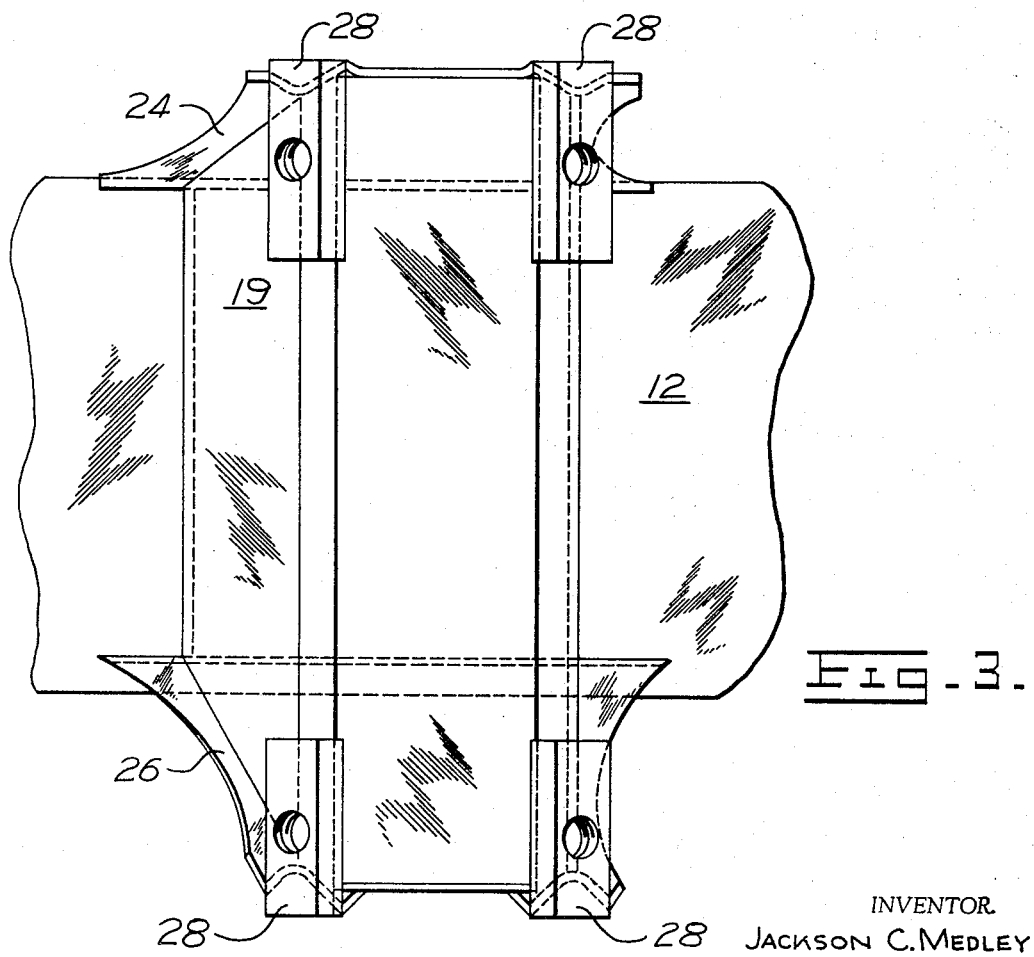
INVENTOR.
JACKSON C. MEDLEY
BY Fryer, Gensvold, Feix & Phillips
ATTORNEYS Dec. 3, 1968   J. C. MEDLEY   3,414,289
MOUNTING STRUCTURE FOR INDIVIDUALLY SUSPENDED VEHICLE WHEELS
Filed July 22, 1966   3 Sheets-Sheet 3

INVENTOR.
JACKSON C. MEDLEY
BY Fryer, Tjensvold, Feix & Phillips
ATTORNEYS

United States Patent Office 3,414,289
Patented Dec. 3, 1968

3,414,289
MOUNTING STRUCTURE FOR INDIVIDUALLY SUSPENDED VEHICLE WHEELS
Jackson C. Medley, East Peoria, Ill., assignor to Caterpillar Tractor Co., Peoria, Ill., a corporation of California
Filed July 22, 1966, Ser. No. 567,185
7 Claims. (Cl. 280—106.5)

ABSTRACT OF THE DISCLOSURE

A wheel support is fastened to the vehicle frame by bolts transpierced through a pair of surfaces of the support which abut conforming surfaces of the frame. The pair of surfaces are oriented at an angle with respect to the direction of vehicle travel and with respect to each other whereby acceleration and braking forces are transmitted between the support and the frame in part by direct pressure of one surface against the abutting surface rather than wholly through the bolts.

---

This invention relates to vehicle wheel mountings and more particularly a highly reliable and durable bracket structure for securing a wheel assembly to the frame of a vehicle.

Many types of vehicles, such as the very large trucks used in construction and mining operations, have wheels which are individually attached to the frame of the vehicle. The members which fasten the wheel assembly to the frame must be capable of withstanding repeated acceleration and braking forces without loosening or wearing unduly. This requirement is particularly severe in the absence of torque rods or other means for transmitting forces between the wheel and the frame independently of the primary connection therebetween.

While a variety of mountings have been used for attaching such a wheel assembly to the frame, virtually all such structures have a bracket which extends from the frame and which has a pair of surfaces against which matching surfaces of the wheel support assembly are bolted. These surfaces have customarily been aligned along the primary direction of travel of the vehicle, i.e. parallel to the vehicle centerline, with the bolts being transverse thereto. As a consequence, extremely large shear stresses are experienced by the bolts during acceleration and braking of the vehicle and fretting between the abutting surfaces is inherent in the structure.

In addition to requiring a large number of bolts and exacting attention to bolt torquing, such wheel mountings are less durable and less reliable than is desirable. The fretting, or small relative movements between the abutting surfaces, results in corrosion and in eventual loosening of the bolts.

It is therefore very desirable that a new form of wheel mounting structure be provided in which the shear stress on the bolts is relieved and in which fretting is reduced. Such a construction allows fewer bolts to be used, with less critical torquing requirements, and greatly reduces maintenance and replacement problems. These beneficial results are provided for in the present invention by inclining the two surfaces on the mounting bracket with respect to the direction of the applied forces and with respect to each other. Acceleration and braking force is then transmitted between the wheel and the frame bracket by direct pressure of one surface against the abutting surface rather than wholly through the bolts.

Accordingly it is an object of this invention to provide a more durable and reliable structure for attaching wheels to a vehicle.

It is a further object of this invention to reduce fretting, and consequent wear and loosening in the connections between the frame and the wheels of a vehicle.

It is another object of this invention to reduce maintenance and replacement problems in connection with individually mounted wheels on vehicles.

It is still another object of this invention to reduce the number of bolts required for securing individually mounted wheels to vehicles.

The invention, together with further objects and advantages thereof, will best be understood by reference to the following specification taken with the accompanying drawings, of which:

FIGURE 1 is a cross section view of a portion of the chassis frame of a truck showing an individually suspended wheel mounted thereon by means of the invention;

FIGURE 2 is a top view of a bracket on the vehicle frame to which the wheel assembly fastens;

FIGURE 3 is a side elevation view of the bracket shown in FIGURE 2;

FIGURE 4 is a plan section view taken along line IV—IV of FIGURE 1 illustrating the juncture between the wheel assembly and elements of the frame.

Figure 5:
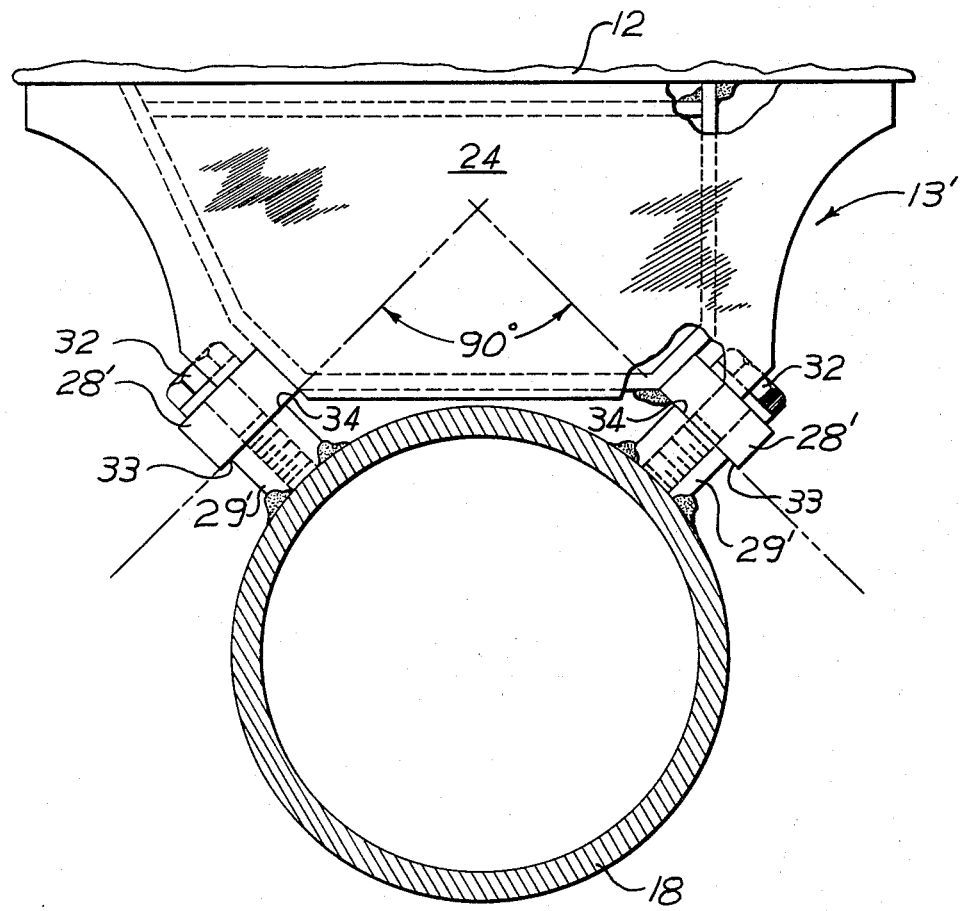
FIGURE 5 is a plan section view of a modified form of the bracket and associated structure.

Referring now to the drawing and particularly to FIGURE 1 thereof, a vehicle wheel assembly 11 is shown attached to the side frame member 12 of a truck chassis by a uniquely shaped bracket 13. Salient elements of the wheel assembly 11 are a wheel 14 secured through a wheel spindle 16 to the lower end of the rod 17 of a substantially upright telescopic wheel suspension device 18. Suitable detailed constructions for the wheel 14, spindle 16 and suspension device 18 are well known to those skilled in the art.

For greatest strength and rigidity, the bracket 13 is made integral with the truck frame member 12 by being welded thereto at all points of contact. Referring now to FIGURES 2 and 3 in conjunction, the bracket 13 has an upright member 19 formed of flat stock which extends directly out from frame member 12 and is then angled to form a section 21 inclined 45° with respect to the side of the frame and subsequently bends again to form a section 22 parallel to the frame member. From section 22 the bracket member 19 turns back towards the frame 12 forming a second section 23 inclined at a 45° angle with respect thereto and inclined 90° with respect to the first angled section 21. From section 23, the bracket member 19 extends back to the frame 12 at a sharper angle. The bracket member 19 is of progressively greater vertical extent outwardly from frame 12 to provide widely spaced points for securing the wheel assembly 11 thereto and thus to strengthen the structure.

Additional elements which serve to strengthen the bracket 13 are top and bottom gusset plates 24 and 26 respectively welded to the top and bottom ends of bracket member 19 and to the vehicle frame 12. An upright stiffener plate 27 extends between the ends of the bracket member 19 parallel to frame member 12 and in proximity thereto.

Mounting surfaces against which the wheel assembly bears are provided on the bracket 13 by four rectangular pads 28. A separate one of the pads 28 is welded to the upper portion of each of the angled sections 21 and 23 of bracket member 19 and to each of the lower portions thereof. The lower pads 28 are slightly further out from frame 12 than the upper pads as sections 21, 22 and 23 of the bracket member 19 are slightly inclined, in this embodiment, to provide for camber of the wheel. This inclination, if any, will of course vary in different embodiments according to the geometry of the particular wheel suspension and other factors known to the art.

Referring now to FIGURE 4, the outer surfaces of the pads 28 are at a 45° angle with respect to the side member 12 of the vehicle frame and thus the two pads at each level are at a 90° angle with respect to each other. This relationship results from the disposition of the pads 28 on the angled sections 21 and 23 of the bracket 13 and is further provided for by machining the outer surfaces of the pads after the pads are welded to the bracket.

To secure the wheel assembly 11 to the bracket 13, four flat tabs 29, strengthened by gussets 31, are welded to the wheel suspension device 18 in position to abut against the four pads 28 of the bracket. Thus the pair of tabs 29 at each level have outer surfaces which are at 90° with respect to each other and which are parallel to the outer surface of the corresponding pad 28 on bracket 13. To insure a precise mating of the surfaces, tabs 28 are also machined after being welded in place on the suspension device 18.

Attachment of the wheel assembly 11 to the bracket 13 is completed by bolts 32 which extend transversely through each pair of pads 28 and tabs 29.

The effect of attaching the wheel assembly 11 to the bracket 13 through angled members such as pads 28 and tabs 29 is that forces directed parallel to the side member 12 of the vehicle frame, such as acceleration and braking forces, are transmitted between the wheel and the frame in part by direct pressure of one of the angled members against a surface of the adjacent one. In a conventional wheel mounting, where the tabs 29 are in effect parallel to the frame 12, virtually all of such forces constitute a shearing force exerted against the bolts. Such structures require more bolts and are subject to fretting with the deleterious consequences hereinbefore discussed.

The extent to which the above described construction converts shear stress on the bolts 32 to direct pressure between abutting surfaces is a function of the angle of the pads 28 and tabs 29 relative to the frame side member 12 and increases as the angle is increased. However too great an inclination of the pads 28 and tabs 29 relative to the frame 12 may be less desirable with respect to other forces, such as the vertical loading, exerted on the wheel mounting. Thus in practice the angle of the pads 28 and tabs 29 may be varied according to the degree to which it is desired to relieve shear force on the bolts 32 as opposed to other considerations, the 45° inclination herein described being an example of the application of the concept which has been found to be an optimum arrangement for many heavy duty trucks.

It is also possible to reverse the angular orientation of the pads 28 and tabs 29 so that the planes of the abutted faces thereof intersect at the side toward bracket 13 rather than the side towards the suspension device 18. Such a construction is shown in FIGURE 5 wherein the bracket 13' is modified to support the pads 28' with the machined surfaces 33 thereof towards each other, the pads still being at a 45° angle with respect to the frame 12. Tabs 29' are secured to the wheel suspension device 18 with the machined surfaces 34 thereof facing away from each other and in position to fit against the surfaces 33 of the pads 28'. Similarly to the previously described embodiment, bolts 32 extend through the pads 28' and are threaded into tabs 29' to secure the wheel assembly 11 to the bracket 13'. Insofar as the transmitting of force between the wheel assembly 11 and frame 12 is concerned, this construction has an effect similar to that of the embodiment of FIGURES 1 to 4, a portion of the force from acceleration and braking of the vehicle being transmitted between the bracket 13' and the wheel assembly through direct pressure of the surfaces 33 and 34 against each other.

What is claimed is:

1. Mounting structure for securing a wheel to a vehicle comprising a wheel support having said wheel journalled thereon and having a pair of upwardly extending first surfaces which are inclined with respect to each other and which define planes that intersect each other and the longitudinal center line of the vehicle, a frame member on said vehicle having a pair of second surfaces which are similarly inclined with respect to each other and with respect to the center line of the vehicle, and means securing said wheel support to said frame member with corresponding ones of said first and second surfaces parallel and disposed against each other wherein said means securing said wheel support to said frame comprises at least one fastener extending across each adjacent pair of said first and second surfaces.

2. Mounting structure for securing a wheel to a vehicle as defined in claim 1 wherein said surfaces are flat and substantially vertical.

3. Mounting structure for securing a wheel to a vehicle as defined in claim 1 wherein said pair of first surfaces are inclined substantially ninety degrees with respect to each other and are inclined substantially forty-five degrees with respect to the centerline of said vehicle.

4. Mounting structure for securing a wheel to a vehicle as defined in claim 1 wherein the planes defined by said pair of first surfaces intersect at a line which is further from said frame member than said first surfaces.

5. Mounting structure for securing a wheel to a vehicle as defined in claim 1 wherein the planes defined by said pair of first surfaces intersect at a line which is closer to said frame member than said first surfaces.

6. Mounting structure for securing a wheel to a vehicle comprising a wheel support having said wheel thereon and having two vertically spaced pairs of first surfaces with the members of each pair defining planes inclined with respect to each other and intersecting along an upwardly extending line, a frame member on said vehicle having an integral bracket projecting therefrom with two vertically spaced pairs of second surfaces wherein the members of each pair are inclined with respect to each other similarly to the inclination of said first surfaces with respect to each other, and means securing said wheel support to said frame member with said first pairs of surfaces and corresponding ones of said second pairs of surfaces being parallel and disposed against each other wherein said means securing said wheel support to said frame comprises at least one fastener extending across each adjacent pair of said first and second surfaces.

7. Mounting structure for securing a wheel to a vehicle comprising a wheel support having said wheel journalled thereon wherein said wheel support is comprised of a substantially upright telescoping suspension device having a pair of tabs projecting obliquely therefrom to form a pair of first surfaces defining planes which are inclined with respect to each other and intersecting along an upwardly extending line, a frame member on said vehicle having a bracket projecting laterally therefrom with obliquely oriented pads forming a pair of second surfaces which are similarly inclined with respect to each other, and means securing said wheel support to said frame member with corresponding ones of said first and second surfaces parallel and disposed against each other wherein said means securing said wheel support to said frame comprises at least one fastener extending across each adjacent pair of said first and second surfaces.

References Cited

UNITED STATES PATENTS

| 2,445,723 | 7/1948 | Brown | 305—27 X |
| 2,914,337 | 11/1959 | Kress | 280—96.2 |
| 3,128,089 | 4/1964 | Burris | 267—64 |
| 3,341,220 | 9/1967 | Kress | 280—124 X |
| 2,397,296 | 3/1946 | Scribner | 280—80 |
| 2,973,819 | 3/1961 | Simmons. | |

RICHARD J. JOHNSON, *Primary Examiner.*